United States Patent [19]

Yamamoto

[11] Patent Number: 4,908,276
[45] Date of Patent: Mar. 13, 1990

[54] REFLECTING PLATE
[75] Inventor: Kanjiro Yamamoto, Osaka, Japan
[73] Assignee: Mita Industrial Co., Ltd., Osaka, Japan
[21] Appl. No.: 691,784
[22] Filed: Jan. 16, 1985
[30] Foreign Application Priority Data
Feb. 1, 1984 [JP] Japan .................................. 59-15245
[51] Int. Cl.$^4$ .............................................. B32B 15/08
[52] U.S. Cl. .................................... 428/458; 428/460; 428/461; 428/912.2
[58] Field of Search ............. 428/458, 460, 461, 912.2
[56] References Cited
U.S. PATENT DOCUMENTS
3,839,129 10/1974 Neumann ......................... 428/912.2
4,491,389 1/1985 Coburn .............................. 428/912.2

FOREIGN PATENT DOCUMENTS
152532 of 1980 Japan .

Primary Examiner—Marion C. McCamish
Attorney, Agent, or Firm—Beveridge, DeGrandi & Weilacher

[57] ABSTRACT

A reflecting plate comprising a substrate, a synthetic resin interlayer formed on the surface of the substrate, and a thin metallic film formed on the synthetic resin interlayer. The reflecting plate may further comprise a transparent synthetic resin layer on the surface of the thin metallic film. A typical use of the reflecting plate is with an illuminating lamp in an electrostatic copying apparatus.

19 Claims, 8 Drawing Sheets

REFLECTING PLATE

FIELD OF THE INVENTION

This invention relates to a reflecting plate, more specifically a reflecting plate which can be suitably used, although not exclusively, in combination with an illuminating lamp provided in a electrostatic copying apparatus.

PRIOR ART

As is well known, various illuminating lamps such as a lamp for illuminating a document to be copied are used in an electrostatic copying apparatus, and reflecting plates of a required shape are annexed to the illuminating lamps. Such reflecting plates are generally made of an aluminum plate whose surface has been chemically polished either directly or after buffing.

The conventional reflecting plates, however, do not have a sufficiently high reflectance. For example, to light having a wavelength of 400 to 700 nm emitted from a halogen lamp generally used as the illuminating lamp, they have a reflectance of only about 60 to 75%.

SUMMARY OF THE INVENTION

It is a primary object of this invention therefore to provide a novel and excellent reflecting plate having a greatly increased reflectance as compared with the conventional reflecting plates.

Another object of this invention is to provide a novel and excellent reflecting plate which in addition to a greatly increased reflectance, has sufficient surface strength and therefore can fully avoid a decrease in reflectance that may be caused by surface cleaning, etc.

According to this invention, there is provided a reflecting plate comprising a substrate, a synthetic resin interlayer formed on the surface of the substrate, and a thin metallic film formed on the surface of the synthetic resin layer.

In a preferred embodiment, a transparent synthetic resin layer is further provided on the surface of the thin metallic film.

BRIEF DESCRIPTION OF THE DRAWINGS

FIGS. 3-A to 3-D are diagrams showing the surface roughnesses of the substrates used in Examples and Comparative Examples.

FIGS. 4-A to 4-F are diagrams showing the surface roughnesses of the substrates in Examples 1 to 4 after the first coating of the resin and the substrates in Comparative Examples 2 and 3 after polishing.

FIGS. 5-A to 5-C are diagrams showing the surface roughnesses of the reflecting plates in Examples 1 to 3 after the second coating of the resin.

FIGS. 6-A to 6-E are diagrams showing the surface roughnesses of the reflecting plates in Examples 1 to 4 and Comparative Example 1 after formation of a thin metallic film.

DETAILED DESCRIPTION OF PREFERRED EMBODIMENTS

The preferred embodiments of this invention will be described below in detail with reference to the accompanying drawings.

Figure 1:
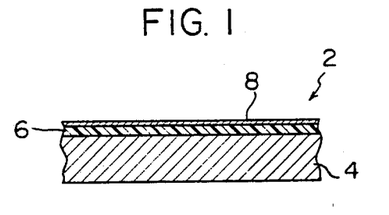
FIG. 1 is a partial sectional view showing a reflecting plate of a three layer structure constructed in accordance with this invention.

With reference to FIG. 1, the illustrated reflecting plate 2 is of a three layer structure and is composed of a substrate 4, a synthetic resin interlayer 6 and a thin metallic film 8.

The substrate 4 which is formed in a shape suitable for the purpose of use may be made of any desired material having sufficient rigidity for maintenance of its required shape. Preferably, it is made of a metallic plate, such as an aluminum plate, a steel plate or a stainless steel plate.

The synthetic resin interlayer 6 formed on the surface of the substrate 4 is preferably formed of a thermosetting resin having sufficient heat resistance to avoid degradation by heat generated by light. Examples of such a thermosetting resin are urea resins, melamine resins, phenolic resins, epoxy resins, unsaturated polyester resins, alkyd resins and urethane resins. The urethane resins and melamine resins are especially preferred. Conveniently, the interlayer 6 is formed by dissolving the resin in an organic solvent such as a thinner, coating the resulting sulution on the surface of the substrate 4 by a suitable method such as spray coating, blade coating, roller coating or dip coating, and then curing the coated layer under heat. As will be clear from Examples given hereinbelow, the formation of the synthetic resin interlayer 6 on the substrate 4 markedly improves the surface roughness of the substrate 4. To obtain sufficiently good surface roughness, the interlayer 6 preferably has a thickness of generally at least 10 $\mu$m, especially at least 20 $\mu$m, although it depends also upon the surface roughness of the substrate 4 itself. As required, the above coating and heat-curing operations are performed twice or further repeated to form the required synthetic resin interlayer 6 on the substrate 4. Preferably, the surface roughness of the synthetic resin interlayer 6 is adjusted to a maximum height, $R_{max}$ defined in JIS B-0601, of not more than 0.5 $\mu$m, especially not more than 0.3 $\mu$m.

The thin metallic film 8 formed on the surface of the interlayer 6 may, for example, be a thin aluminum film. The thin metallic film 8 can be conveniently formed on the surface of the interlayer 6 by a vacuum deposition method. If desired, other techniques such as sputtering may be used to form the thin metallic film 8 on the surface of the interlayer 6. The thickness of the metallic film 8 may be about 800 to 1,200 Å.

As is clear from Comparative Examples to be given hereinbelow, when the thin metallic film 8 is directly formed on the surface of the substrate 4 by omitting the formation of the interlayer 6, the relatively large surface roughness of the substrate directly affects the surface roughness of the thin metallic film 8, and the surface roughness of the thin metallic film 8 becomes relatively large. Consequently, a sufficiently high reflectance cannot be obtained.

Figure 2:
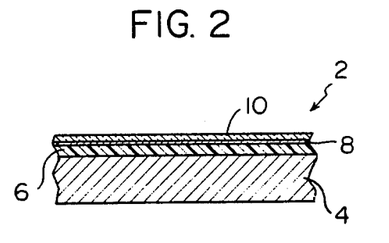
FIG. 2 is a partial sectional view showing a reflecting plate of a four layer structure constructed in accordance with this invention.

FIG. 2 shows a modified embodiment of the reflecting plate 2 constructed in accordance with this invention. This modified embodiment is of a four layer structure, and includes a transparent synthetic resin layer 10 in addition to the substrate 4, interlayer 6 and thin metallic film 8.

The substrate 4, the synthetic resin interlayer 6 and the thin metallic film 8 may be the same as in the reflecting plate 2 shown in FIG. 1.

The transparent synthetic resin layer 10 to be formed on the surface of the thin metallic film 8 is preferably formed of a thermosetting resin having sufficient heat resistance to avoid degradation by heat generated by light, as in the case of the interlayer 6. Examples of such a thermosetting resin are urea resins, melamine resins, phenolic resins, epoxy resins, unsaturated polyester resins, alkyd resins and urethane resins. The urethane resins and melamine resins are especially preferred. Conveniently, the transparent synthetic resin layer 10 is formed on the surface of the metallic film 8 by dissolving the resin in a solvent such as a thinner, coating the resulting solution on the surface of the thin metallic film 8 by a suitable coating method such as spray coating, blade coating, roller coating or dip coating, and thereafter curing the coating under heat.

The transparent synthetic resin layer 10 constitutes a protective coating for the thin metallic film 8, and prevents the surface of the reflecting plate 2 from being damaged and consequently decreased in reflectance when, for example, it is cleaned by a cloth or the like. To obtain a sufficient protecting effect, the surface hardness of the transparent synthetic resin layer 10 should desirably be 2H or higher, particularly 4H or higher, in terms of the pencil hardness defined in JIS K-5400. The transparent synthetic resin layer 10 preferably has a thickness of 5 to 25 $\mu$m, especially 10 to 20 $\mu$m. If the thickness of the transparent synthetic resin layer is exceedingly small, its protective action becomes insufficient. If it is exceedingly large, the decrease of the reflectance attributed to the transparent layer 10 becomes too large.

EXAMPLES 1 to 4 AND COMPARATIVE EXAMPLES 1 TO 3

In each run, a square substrate having a thickness of 1 mm with one side measuring 50 mm was prepared from each of the metallic plates indicated in Table 1. The surface roughness of the substrate was measured by a surface shape measuring instrument (Model SE-3C made by Kosaka Kenkyusho K.K., Japan). The results are shown in FIGS. 3-A to 3-D.

Figure 3:
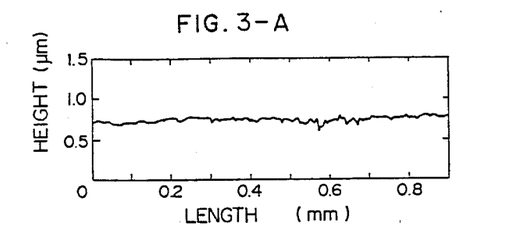

The maximum height values ($R_{max}$) were calculated in accordance with JIS B-0601 from the results of the measurement shown in FIGS. 3-A to 3-D. The results are shown in Table 1.

TABLE 1

| Substrate designation | Material of the substrate (*1) | Surface roughness | $R_{max}$ ($\mu$m) |
|---|---|---|---|
| A | Aluminum plate (A1050) | FIG. 3-A | 0.3 |
| B | Steel plate (SECC) | FIG. 3-B | 6.0 |
| C | Steel plate (SPCC) | FIG. 3-C | 4.0 |
| D | Stainless steel plate (SUS 430) | FIG. 3-D | 0.3 |

(*1): The parenthesized designations are in accordance with "Iron, steel and non-ferrous metals" in JIS standards.

A reflecting plate was made by treating the substrate by the operations shown in Table 2.

TABLE 2

| Example (Ex.) or Comparative Example (CEx.) | Substrate designation | Formation of a synthetic resin interlayer or polishing, etc. (*1) | Formation of a thin metallic film (*2) |
|---|---|---|---|
| Ex. 1 | A | Two resin coatings | Yes |
| Ex. 2 | B | Two resin coatings | Yes |
| Ex. 3 | C | Two resin coatings | Yes |
| Ex. 4 | D | One resin coatings | Yes |
| CEx. 1 | A | Not treated | Yes |
| CEx. 2 | A | Chemical polishing | No |
| CEx. 3 | A | Buffing and chemical polishing | No |

(*1): Coating of the resin was carried out as follows: A coating solution composed of 30% by weight of a urethane resin (MT-260 made by Japan Bee Chemical Co., Ltd., Japan) and 70% by weight of a thinner was prepared. The solution was spray-coated substantially uniformly on the surface of the substrate, and then heated at 100° C. for 90 minutes. The expression "Two resin coatings" in Table 2 means that the aforesaid coating operation was carried out twice.
(*2): The thin metallic film was formed by vaccum-depositing aluminum in a thickness of 800 to 1,200 Å by a resistance heating method.

The thickness of the synthetic resin interlayers formed by resin coating in Examples 1 to 4 were measured, and the results are shown in Table 3.

The surface roughnesses of the synthetic resin interlayers in Examples 1 to 4 and the surface roughnesses of the substrates after polishing in Comparative Examples 2 and 3 were measured in the same way as in the measurement of the surface roughnesses of the substrates. The results are shown in FIGS. 4-A to 4-F and FIGS. 5-A to 5-C.

Figure 4:
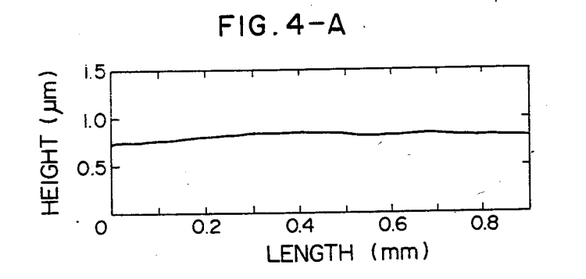
Figure 5:
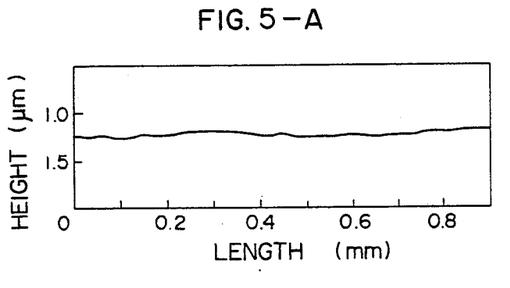

From the results shown in FIGS. 4-A to 4-F and FIGS. 5-A to 5-C, the maximum height ($R_{max}$) values in accordance with JIS B-0601 were calculated, and the results are shown in Table 3.

Figure 6:
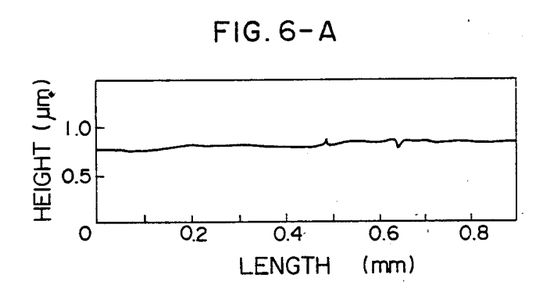

The surface roughnesses of the thin metallic films in Examples 1 to 4 and Comparative Example 1 were measured in the same way as above, and the results are shown in FIGS. 6-A to 6-E.

TABLE 3

| Example (Ex.) or Comparative Example (CEx.) | First resin coating (or polishing) | | | Second resin coating | | | Formation of a thin metallic film (Surface roughness) |
|---|---|---|---|---|---|---|---|
| | Thickness ($\mu$m) | Surface roughness | $R_{max}$ ($\mu$m) | Thickness | Surface roughness | $R_{max}$ ($\mu$m) | |
| Ex. 1 | 15 | FIG. 4-A | 0.1 | 20 | FIG. 5-A | 0.1 | FIG. 6-A |
| Ex. 2 | 16 | FIG. 4-B | 1.2 | 28 | FIG. 5-B | 0.3 | FIG. 6-B |
| Ex. 3 | 12 | FIG. 4-C | 0.2 | 25 | FIG. 5-C | 0.2 | FIG. 6-C |
| Ex. 4 | 18 | FIG. 4-D | 0.1 | — | — | — | FIG. 6-D |
| CEx. 1 | — | — | — | — | — | — | FIG. 6-E |
| CEx. 2 | — | FIG. 4-E | 0.3 | — | — | — | — |
| CEx. 3 | — | FIG. 4-F | 0.3 | — | — | — | — |

Figure 7:
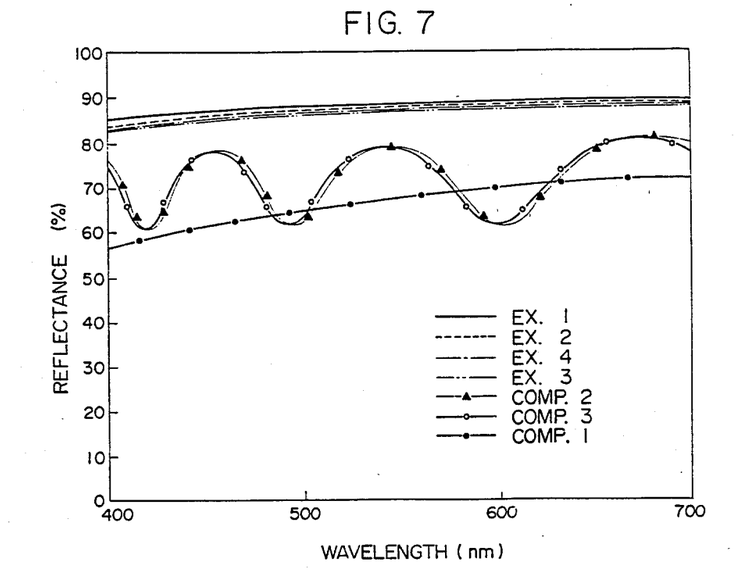
FIG. 7 is a diagram showing the reflectances of the reflecting plates obtained in Examples 1 to 4 and Comparative Examples 1 to 3.

The reflectances of the reflecting plates produced as above in Examples 1 to 4 and Comparative Examples 1 to 3 were measured by a self-spectrophotometer (Double Monochrometer UV-365 made by Shimazu Seisakusho Co., Ltd., Japan), and the results are shown in FIG. 7.

It is seen from FIG. 7 that while the reflecting plates obtained in Comparative Examples 1, 2 and 3 had an average reflectance of about 65 to 70%, the reflecting plates obtained in Examples 1, 2, 3 and 4 had an average reflectance of at least about 85%, and as high as about 90% at a wavelength of 600 to 700 nm. This increase in the reflectances of the reflecting plates of Examples 1 to 4 over those of the reflecting plates of Comparative Examples 1 to 3 is presumably because they have nearly the same maximum height $R_{max}$ values on the surface, but the surface roughness conditions of the plates of Examples 1 to 4 were markedly improved as can be easily understood from a comparison of FIGS. 3-A, 4-E, 4-F and 6-E with FIGS. 6-A to 6-D.

Furthermore, a transparent synthetic resin layer was formed as follows on the surface of the thin metallic film of the reflecting plate obtained in Example 1. A coating solution was prepared which consisted of 30% by weight of a urethane resin (6062, a product of Fujikura Paint Co., Ltd., Japan) and 70% by weight of a thinner. The solution was spray-coated substantially uniformly on the surface of the thin metallic film, and then heated at 70° C. for 1 hour to form a transparent synthetic resin layer having a thickness of 15 μm.

The surface hardness of the reflecting plate of Example 1 was measured by the method of measuring pencil hardness in accordance with JIS K-5400 before and after the formation of the transparent synthetic resin layer. The results are shown in Table 4.

TABLE 4

|  | Pencil hardness |
|---|---|
| Before formation of the transparent resin layer | HB |
| After formation of the transparent resin layer | 4H |

The results given in Table 4 demonstrate that the formation of the transparent synthetic resin layer improves the surface hardness of the reflecting plate, and therefore increases its resistance to surface cleaning or the like.

Figure 8:
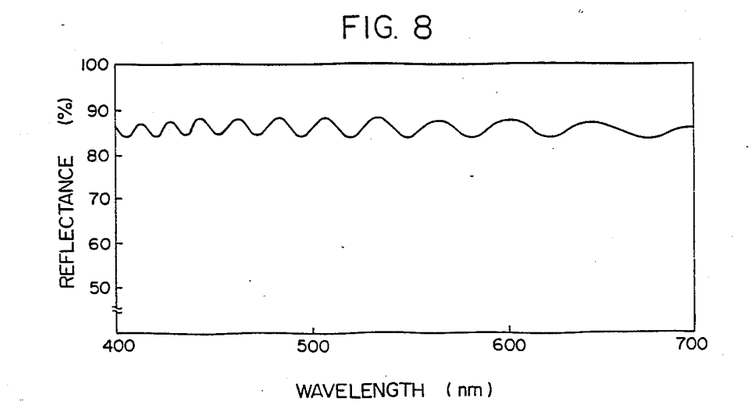
FIG. 8 is a diagram showing the reflectance of the reflecting plate of Example 1 after formation of a transparent synthetic resin layer.

The reflectance of the above plate after formation of the transparent resin layer was measured in the same way as above, and the results are shown in FIG. 8.

It is understood from FIG. 8 that the presence of the transparent resin layer slightly decreased the reflectance, but the plate still retained an average reflectance of as high as at least 80%.

What is claimed is:

1. A reflecting plate for an illuminating lamp comprising
   a substrate having a surface,
   a thermosetting synthetic resin interlayer formed on the surface of the substrate, and
   a thin metallic film formed on the surface of the thermosetting synthetic resin interlayer.
2. The reflecting plate of claim 1 which further comprises a transparent thermosetting synthetic resin layer formed on the surface of the thin metallic film.
3. The reflecting plate of claim 2 wherein the thermoplastic synthetic resin is a urethane resin.
4. The reflecting plate of claim 2 wherein the thermosetting synthetic resin is a melamine resin.
5. The reflecting plate of claim 2 wherein the transparent synthetic resin layer is formed on the surface of the thin metallic film by dissolving the synthetic resin in a solvent, coating the resulting solution on the surface of the thin metallic film, and thereafter curing it under heat.
6. The reflecting plate of claim 2 wherein the transparent synthetic resin layer has a thickness of 5 to 25 μm.
7. The reflecting plate of claim 6 wherein the transparent synthetic resin layer has a thickness of 10 to 20 μm.
8. The reflecting plate of claim 2 wherein the transparent synthetic resin layer has a surface hardness of 2H or higher in terms of pencil hardness.
9. The reflecting plate of claim 8 wherein the transparent synthetic resin layer has a pencil hardness of 4H or higher.
10. The reflecting plate of claim 1 wherein the substrate is composed of a metallic plate.
11. The reflecting plate of claim 10 wherein the synthetic resin interlayer has a thickness of at least 10 μm.
12. The reflecting plate of claim 11 wherein the synthetic resin interlayer has a thickness of at least 20 μm.
13. The reflecting plate of claim 10 wherein the synthetic resin interlayer has a surface roughness, $R_{max}$, of not more than 0.5 μm.
14. The reflecting plate of claim 13 wherein the synthetic resin interlayer has a surface roughness, $R_{max}$, of not more than 0.3 μm.
15. The reflecting plate of claim 1 wherein the thermosetting synthetic resin is a urethane resin.
16. The reflecting plate of claim 1 wherein the thermosetting synthetic resin is a melamine resin.
17. The reflecting plate of claim 1 wherein the synthetic resin interlayer is formed on the surface of the substrate by dissolving the synthetic resin in a solvent, coating the resulting solution on the surface of the substrate and thereafter curing it under heat.
18. The reflecting plate of claim 1 wherein the thin metallic film is a thin aluminum film.
19. The reflecting plate of claim 1 wherein the thin metallic film is formed on the surface of the synthetic resin interlayer by vacuum deposition.

* * * * *